April 4, 1961 R. B. DOME 2,978,626
DIRECT CURRENT TRANSFORMER
Filed Dec. 31, 1958
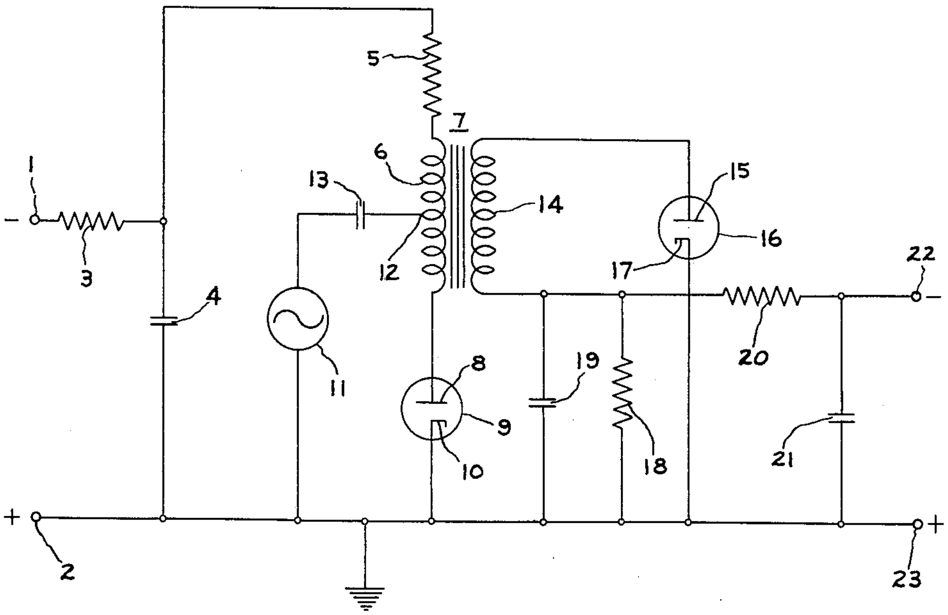
INVENTOR
ROBERT B. DOME
BY Donald N. Timbie
HIS ATTORNEY United States Patent Office 2,978,626

Patented Apr. 4, 1961

2,978,626

DIRECT CURRENT TRANSFORMER

Robert B. Dome, Geddes Township, Onondaga County, N.Y., assignor to General Electric Company, a corporation of New York Filed Dec. 31, 1958, Ser. No. 784,333

3 Claims. (Cl. 321—2)

This invention relates to a circuit for transforming a direct current at low potential and relatively high current to a higher direct current potential at a relatively low current.

There are many applications for such a circuit including e.g. for amplifying the automatic gain control voltage in a television or radio receiver; however, previous circuits have used expensive direct current amplifiers.

Accordingly, it is an object of this invention to provide an improved less expensive means for achieving such a transformation.

Briefly, this objective is achieved in accordance with the principles of this invention by exciting a transformer with alternating current in a balanced fashion such that in the absence of an input direct current potential no voltage appears at the output of the transformer, and applying a direct current potential to be transformed in such manner as to upset the balance and permit an alternating current voltage to appear at the output of the transformer. This output is rectified so as to produce the desired direct current voltage output. The step up in the direct current output voltage is controlled by the effective turns ratio of the transformer.

The single figure of the drawing shows a direct current transformation system in accordance with the invention.

In the circuit of the drawing, the direct current potential to be transformed is applied between the terminals 1, 2 and is shown as having its positive polarity at ground, as is usually the case for automatic gain control voltages. Any high frequency A.C. components are filtered by means of a series resistor 3 and a capacitor 4. The smoothed D.C. across the capacitor 4 is applied through a resistor 5 to one end of a primary winding 6 of a transformer 7. The other end of the primary winding 6 is connected to the anode 8 of a diode 9, the cathode 10 thereof being connected to ground.

A.C. excitation is supplied by any suitable source 11 that is connected to ground on one side and to a tap 12 on the primary winding 6 through a suitable blocking capacitor 13 on the other side.

The transformed output is derived by the following means. The secondary 14 of the transformer 7 has one terminal connected to the anode 15 of a second diode 16, the cathode 17 thereof being grounded. The other terminal of the secondary 14 is connected to a diode load circuit comprised of a resistor 18 shunted by a suitable by-pass capacitor 19, the other terminal of the load circuit being connected to ground. The D.C. voltage developed across the load resistor 18 may be further smoothed, if desired, by the addition of a filter comprised of a series resistor 20 followed by a shunt capacitor 21. The final transformed output appears at terminals 22, 23 with the positive polarity grounded.

The operation of the circuit is as follows. The primary 6 of the transformer 7 is connected in a bridge network, one arm of which contains the part of the primary winding 6 above the tap 12, the resistor 5 and the capacitor 4, and the other arm of which contains the diode 9 and the part of the primary winding 6 below the tap 12. If the impedance of the capacitor 4 is negligible, if the parts of the primary winding 6 above and below the tap 12 have the same impedance and if the resistance of the resistor 5 is equal to the effective resistance of the diode 9 for the A.C. excitation currents, the bridge is balanced. Under this condition half of the alternating current provided by the source 11 flows from the tap 12 through the upper half of the primary wind 6, and the other half flows from the tap 12 through the lower half. If the upper and lower halves of the primary winding 6 are wound in the same sense, the voltages induced in the secondary winding 14 will be in opposite directions and hence will cancel, and no voltage appears at the output terminals 22, 23.

If a D.C. voltage is introduced between the terminals 1, 2 with the indicated polarity, the negative voltage at the terminal 1 is applied to the anode 8 of the diode 9 via the resistor 5 and the primary winding 6 and causes the effective resistance of the diode for the A.C. currents to be increased from its initial value. The bridge is now unbalanced so that a smaller portion of the alternating current flows through the lower half of the primary winding 6 than through the upper portion. As a result, the voltage induced in the secondary winding 14 by the lower half of the primary winding 6 is less than that induced by the upper half, and a resultant A.C. voltage appears across the secondary winding 14. This resultant voltage is rectified by the diode 16 and the rectified output appears across the load 18, 19 with the polarity indicated at the output terminals 22, 23. The polarity could be reversed by reversing the diode 16. The greater the input voltage the more the unbalance of the bridge circuit, and the greater the D.C. output voltage. Eventually, however, enough input D.C. voltage will be delivered to the diode 9 to completely bias it off, and beyond this point no further increase in output voltage is produced. If this circuit is used to amplify the A.G.C. voltage, this level may be chosen by proper circuit design so that it is more than enough to completely bias off any intermediate frequency or radio frequency amplifier.

It is not necessary that the tap 12 be at the center of the primary winding 6, because the value of the resistor 5 can be adjusted to obtain the required balance.

While I have illustrated a particular embodiment of my invention, it will of course be understood that I do not wish to be limited thereto, since various modifications, both in the circuit arrangement and in the instrumentalities, may be made and I contemplate by the appended claims to cover any such modifications as fall within the true spirit and scope of the invention.

What I claim and desire to secure by Letters Patent of the United States is:

1. A circuit for transforming a direct current potential comprising a transformer having primary and secondary windings, a tap on said primary winding, a point of reference potential, a first unilateral current conducting device connected between one end of said primary winding and said point of reference potential, a source of alternating current voltage and a capacitor connected in series between said tap and said point of reference potential, a resistor and a source of the direct current potential to be transformed connected in series between the other end of said secondary winding and said point of reference potential, the resistance of said resistor being equal to the resistance of said unilateral device for the alternating current caused to flow through said device by said source of alternating current, said source of direct current potential having a negligible impedance at the frequency of said alternating voltage, a second unilateral current conducting device connected between one end of said secondary winding and said point of reference potential, and a load circuit for said second unilateral current conducting device comprised of a resistor and a capacitor coupled or parallel connected between the other end of said secondary winding and said point of reference potential, the desired transformed direct current potential appearing across said load circuit.

2. A system for transforming the potential of a direct current voltage comprising a transformer having primary and secondary windings, a unidirectional conducting device connected between one end of said primary winding and a reference potential point, a resistance and capacitance connected in series between the other end of said primary winding and said reference potential point, means for applying an alternating current voltage source between an intermediate connection of said primary winding and said reference potential point, means for applying said direct current voltage across said capacitor, and active means for rectifying the current induced in the secondary of said transformer.

3. A circuit for transforming a direct current potential from one voltage level to another comprising a transformer having a tapped primary winding and a secondary winding, a bridge network balanced for alternating current voltage said bridge network having two parallel arms, one of said arms including the portion of said primary winding on one side of said tap, a resistor and a source of direct current potential to be transformed, the other of said arms including the portion of said primary winding on the other side of said tap and a unilateral current conducting device, said latter device being polarized so as to oppose the flow of current therethrough caused by said source of direct current potential, a source of alternating current voltage and a capacitor connected in series across said arms of said bridge, and means for rectifying any voltage appearing across said secondary winding.

References Cited in the file of this patent

UNITED STATES PATENTS 2,342,238 Barney ---------------- Feb. 22, 1944
2,414,317 Middel ---------------- Jan. 14, 1947